Aug. 24, 1965 D. R. FRANKL 3,202,891
VOLTAGE VARIABLE CAPACITOR WITH STRONTIUM TITANATE DIELECTRIC
Filed Nov. 30, 1960

INVENTOR
DANIEL R. FRANKL
BY
R. J. Frank
ATTORNEY

United States Patent Office 3,202,891
Patented Aug. 24, 1965

3,202,891
VOLTAGE VARIABLE CAPACITOR WITH STRONTIUM TITANATE DIELECTRIC

Daniel R. Frankl, Bayside, N.Y., assignor to General Telephone and Electronics Laboratories, Inc., a corporation of Delaware Filed Nov. 30, 1960, Ser. No. 72,790
2 Claims. (Cl. 317—258)

This invention relates to non-linear capacitors utilizing semiconductor materials.

Non-linear capacitors comprising a semiconductor wafer and a layer composed of an oxide of the semiconductor material deposited on one or both surfaces thereof have been disclosed in the prior art. When a varying voltage is applied across this type of device, the capacitance existing in the space-charge region at the surface of the semiconductor bounded by the oxide layer changes in a non-linear manner with applied voltage. However, it has been found that even with a thin oxide layer the overall capacitive variation obtainable is quite small. Further, if thicker layers of oxide are applied, the variations in capacitance become still smaller. The thin oxide layers required limit the maximum voltage that may be applied across the capacitor without causing breakdown and the relatively small changes in capacitance limit the application of the device in practical electronic circuits.

Accordingly, it is an object of this invention to provide an improved solid-state non-linear capacitor.

It is another object of the invention to provide a non-linear capacitor in which a relatively large change in capacitance is obtained for a given change in voltage.

Still another object is to provide a non-linear capacitor which can be subjected to a relatively high voltage without breakdown.

A further object is to provide a non-linear capacitor utilizing semiconductive materials in which a relatively thick dielectric layer may be applied to the surface of the semiconductor while still obtaining a relatively large change in capacitance for a given change in voltage.

In the present invention, a layer composed of an insulating material having a relatively high dielectric constant is applied to the surface of a semiconductor substrate or wafer. The semiconductor wafer may consist of germanium, silicon, indium antimonide, gallium arsenide, or other semiconductor materials. The insulating or dielectric layer applied to the surface of the semiconductor consists of a material having a substantially higher dielectric constant than the dielectric constants of the oxides used in known devices. For example, titanium dioxide, strontium titanate, or lead zirconate-titanate may be used in the present invention, these materials having dielectric constants K of about 100, 310 and 1000 respectively. The dielectric constants of these materials are quite high when compared with values of about 4 which are characteristic of semiconductor oxide layers.

In a preferred embodiment of the invention a first metallic electrode is affixed to the surface of the high dielectric layer while a second electrode is fastened to the semiconductor surface remote from the dielectric layer. The capacitance of the insulating layer is proportional to its dielectric constant and, therefore, is quite high when compared to the capacitance of an oxide layer of the same thickness. Since the capacitance of the dielectric layer in series with the capacitance of the semiconductor is much higher than the semiconductor capacitance, the dielectric layer has relatively little effect on the total capacitance of the device. As a result, the total change from minimum to maximum capacitance is comparatively great. Further, the electric field strength in the dielectric layer required to drive the capacitance to its maximum value is of the order of a few thousand volts per centimeter. In contrast, if the much thinner oxide layer needed to achieve the same capacitance change were used, it would require a field strength of several hundred thousand volts per centimeter, thereby approaching or exceeding its breakdown limit.

The above objects of and the brief introduction to the present invention will be more fully understood and further objects and advantages will become apparent from a study of the following description in connection with the drawings wherein.

Figure 1:
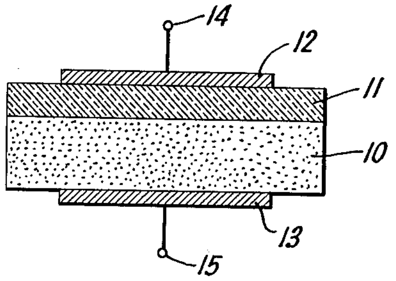
FIG. 1 is a cross-sectional diagram of a non-linear capacitor constructed in accordance with my invention.

Referring to FIG. 1, there is shown a non-linear capacitor comprising a semiconductor wafer 10 composed of N-type germanium having a donor concentration $N_D$ in the range of about $10^{14}$ to $10^{18}$ per cubic centimeter. Other semiconductor materials may also be used, germanium and indium antimonide being best suited for high frequency where high carrier mobility is required and silicon being employed at lower frequencies due to its lower intrinsic carrier concentration.

A layer 11 of strontium titanate having a dielectric contact K of about 310 and a thickness of approximately 100 Angstroms is deposited on the surface of semiconductor wafer 10 by any suitable known deposition process such as evaporation. Other relatively high dielectric materials, such as lead zirconate-titanate ($K=1000$) and titanium dioxide ($K=100$) may also be employed for employed for layer 11. For example, titanium dioxide films have been deposited on germanium and silicon substrates by the reaction of titanium tetrachloride and water. The reactants are carried in concentric nitrogen streams and allowed to impinge on the heated substrate in the manner described in an article by Tanner and Lockhart in the Journal of the American Optical Society, vol. 36, page 701, 1946. Capacitances as high as $2\times10^{-7}$ farads per square centimeter have been achieved on films about 2000 Angstroms thick in this way.

Figure 2:
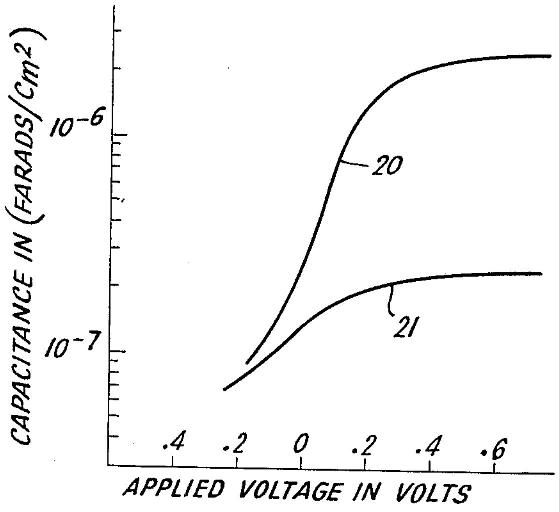
FIG. 2 is a graph showing the variation in capacitance with changes in applied voltage using different insulating layers.

An electrode 12 is applied to the surface of dielectric layer 11 and an electrode 13 is affixed to the surface of wafer 10. As shown in FIG. 2, when a voltage source is applied across terminals 14 and 15 and its magnitude gradually increased the total capacitance of the capacitor increases in a non-linear manner. Curve 20 shows the variation in capacitance obtained when layer 11 consists of a 1000 Angstrom coating of strontium titanate deposited on a germanium wafer having a donor concentration of $10^{16}$ per cubic centimeter while curve 21 illustrates, for comparison, the change in capacitance obtained with a prior art device in which a 130 Angstrom layer of germanium oxide is formed on the surface of the germanium wafer. Comparison of these curves shows that the titanate layer gives much greater sensitivity than the known oxide layers. Still greater sensitivity results when thinner titanate layers or materials of still higher dielectric constant are used.

Figure 3:
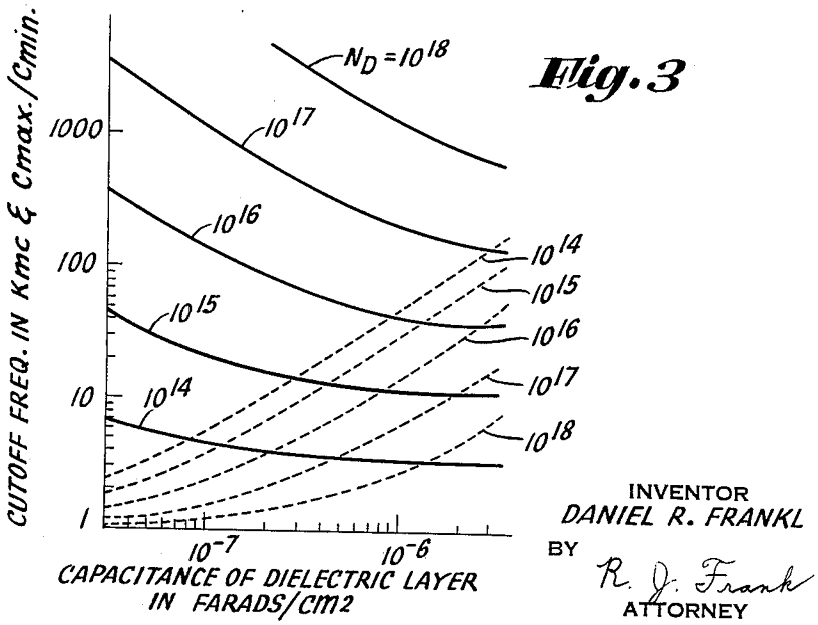
FIG. 3 is a graph depicting the relationship between the cutoff frequency and ratio of maximum to minimum capacitance of the device as a function of the capacitance of the dielectric layer at a fixed applied voltage.

FIG. 3 illustrates in solid lines the variations in cutoff frequency as a function of the capacitance of the dielectric layer or germanium substrates having various impurity concentrations. Cutoff frequency is defined as the frequency at which the resistance and reactance of the device become equal. The dashed curves in FIG. 3 show the relationship between the ratio of maximum capacitance to minimum capacitance ($C_{max}/C_{min}$) for the device as a function of the capacitance of the dielectric layer. From FIG. 3 it is evident that, using n-type germanium with $10^{16}$ donors per cubic centimeter for the wafer 10, the maximum capacitance ratio is approximately 40 to 1 (dashed curve) and the cutoff frequency approximately 40 kilomegacycles per second (solid curve). In order to achieve this performance with a germanium oxide layer, the thickness could not be greater than 12 Angstroms, and the layer would be extremely sensitive to mechanical or electrical breakdown. A much thicker layer of a high dielectric material provides this capacitance ratio without danger of breakdown.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. A non-linear capacitor comprising first and second electrodes, a germanium wafer, and a layer of strontium titanate having a thickness of 1000 Angstroms interposed between and affixed directly to the surface of said germanium wafer and to the surface of said first electrode, said second electrode being affixed to the other surface of said semiconductor wafer.

2. The non-linear capacitor defined in claim 1 wherein said germanium wafer is n-type and has a donor concentration of from $10^{14}$ to $10^{18}$ per cubic centimeter.

References Cited by the Examiner

UNITED STATES PATENTS

| | | | |
|---|---|---|---|
| 2,520,376 | 8/50 | Roup | 317—258 |
| 2,611,039 | 9/52 | Hepp | 317—258 |
| 2,673,949 | 3/54 | Khouri | 317—258 |
| 2,836,776 | 5/58 | Ishikawa | 317—242 |
| 2,884,607 | 4/59 | Uhlir | 317—259 |
| 2,964,648 | 12/60 | Doucette | 317—242 |
| 2,989,650 | 6/61 | Doucette | 317—242 |
| 3,065,393 | 11/62 | Okamoto et al. | 317—242 X |
| 3,138,743 | 6/64 | Kilby | 317—101 |

OTHER REFERENCES

Birks, J. B.: Modern Dielectric Materials, Heywood and Co. Ltd., London, 1960 (page 181).

JOHN F. BURNS, *Primary Examiner.*

SAMUEL BERNSTEIN, IRVIN L. SRAGOW, *Examiners.*